US010268722B2

United States Patent
Ratcliff et al.

(10) Patent No.: US 10,268,722 B2
(45) Date of Patent: Apr. 23, 2019

(54) MULTIPLE PARALLEL QUERIES ON MULTIPLE DATABASES FOR BIG DATA INJECTION

(71) Applicant: ADP, LLC, Roseland, NJ (US)

(72) Inventors: Michael Ratcliff, Roseland, NJ (US); James Haas, Bridgewater, NJ (US); Marc Rind, Summit, NJ (US); Venkata Turlapati, Roseland, NJ (US)

(73) Assignee: ADP, LLC, Roseland, NJ (US)

( * ) Notice: Subject to any disclaimer, the term of this patent is extended or adjusted under 35 U.S.C. 154(b) by 208 days.

(21) Appl. No.: 15/462,850

(22) Filed: Mar. 18, 2017

(65) Prior Publication Data
US 2018/0268026 A1 Sep. 20, 2018

(51) Int. Cl.
*G06F 17/30* (2006.01)

(52) U.S. Cl.
CPC .. *G06F 17/30445* (2013.01); *G06F 17/30112* (2013.01); *G06F 17/30144* (2013.01); *G06F 17/30215* (2013.01)

(58) Field of Classification Search
CPC .................................................. G06F 17/30445
See application file for complete search history.

(56) References Cited

U.S. PATENT DOCUMENTS

| 5,590,319 A | 12/1996 | Cohen et al. |
| 6,968,335 B2 | 11/2005 | Bayliss et al. |

*Primary Examiner* — Grace Park
(74) *Attorney, Agent, or Firm* — Yee & Associates, P.C.

(57) ABSTRACT

A computer-implemented method for processing information in a big data environment. A target query is received. The target query is run against a catalog to obtain desired fields for search and to filter for specific targets from which data will be extracted. Responsive to the query, particular data is extracted from the specific targets. Extracting includes defining a query pack comprising a configuration file and one or more files containing queries to execute on each target in the specific targets, the configuration file containing a section for each of the one or more files to customize configurations for each of the one or more files, and particular connection information defining relationships among the specific targets. One ingestion daemon is executed for every file of the one or more files in the query pack to produce results. The results are processed in a distributed parallel computing environment.

20 Claims, 5 Drawing Sheets

MULTIPLE PARALLEL QUERIES ON MULTIPLE DATABASES FOR BIG DATA INJECTION

BACKGROUND INFORMATION

1. Field

The present disclosure relates to methods and devices for improving the speed of processing big data from an undefined number of relational databases by using multiple parallel queries on multiple databases for big data injection.

2. Background

"Big data" has become of increasing interest in the information age. "Big data" is a term that refers to amounts of data that are so large that it would be impossible for a human to sort or analyze all of the data. However, with the advent of fast computers and specialized software, big data may be mined to glean facts regarding subjects of interest or even to determine trends in events or industries. Nevertheless, working with big data can still present many technical challenges because of the sheer volume of the information, or because of the format of the information.

For example, traditional Internet search engines do not search relational databases well. Additionally, such engines have difficulty extracting data from some formats, such as an undefined number of multiple relational databases.

In another example, even if a fast computer programmed with specialized software is used to process big data, the amount of data being analyzed can be so vast that the processing time becomes unacceptably slow. Thus, techniques are need to improve the effective speed of computers processing big data.

SUMMARY

The illustrative embodiments provide for a computer-implemented method. The method includes receiving a target query at a computer. The target query comprising a file specified by a user which defines what information is of interest to the user. The method also includes running, by the computer, the target query against a catalog to obtain desired fields for search and to filter for specific targets from which data will be extracted. The catalog comprises a relational database storing first connection information among a first plurality of targets that together compose a big data environment. The specific targets are a subset of the first plurality of targets. The method also includes extracting, responsive to the query, particular data from the specific targets. Extracting includes defining a query pack comprising a configuration file and one or more files containing queries to execute on each target in the specific targets. The configuration file contains a section for each of the one or more files to customize configurations for each of the one or more files. The configuration file also comprises particular connection information defining relationships among the specific targets, the particular connection information being part of the first connection information. Extracting also includes executing one ingestion daemon for every file of the one or more files in the query pack. Each ingestion daemon monitors a local output file system for output files and concatenates the output files. Each ingestion daemon avoids opening the output files, wherein executing results in a particular data set. The method also includes breaking the particular data set into a plurality of blocks. The method also includes distributing ones of the plurality of blocks to corresponding ones of different computers that are all in communication with a master node computer. The method also includes performing parallel processing of the plurality of blocks using the different computers, with the master node computer coordinating the parallel processing. The method also includes returning a result of the target query based on the parallel processing.

The illustrative embodiments also contemplate a non-transitory computer-recordable storage medium storing program code which, when executed by a processor, performs a computer-implemented method. The method may be as described above.

The illustrative embodiments also provide for a computer-implemented method. The method includes receiving a query. The method also includes, based on the query, wrapping target information in a query pack. The target information defines a subset of targets in a plurality of targets. The plurality of targets comprises a plurality of schema and a plurality of relational databases in a big data environment. The query pack comprises a tarball containing one configuration file and a plurality of queries to execute on each of the subset of targets. The method also includes defining a plurality of destination directories for each of the plurality of queries. The method also includes spawning a plurality of ingestion daemons. One corresponding ingestion daemon is spawned for each of the plurality of queries. The method also includes fetching target information from a catalog defining relationships among the subset of targets. The method also includes extracting, using the plurality of ingestion daemons, corresponding data from the subset of targets into corresponding ones of the plurality of destination directories based on the target information and the query pack. The method also includes processing the corresponding data using parallel processing performed by a plurality of computers coordinated by a master node computer. Processing produces a result of the query.

The illustrative embodiments also contemplate a computer configured to execute program code which implements the above methods. Thus, the illustrative embodiments are not necessarily limited to these examples.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
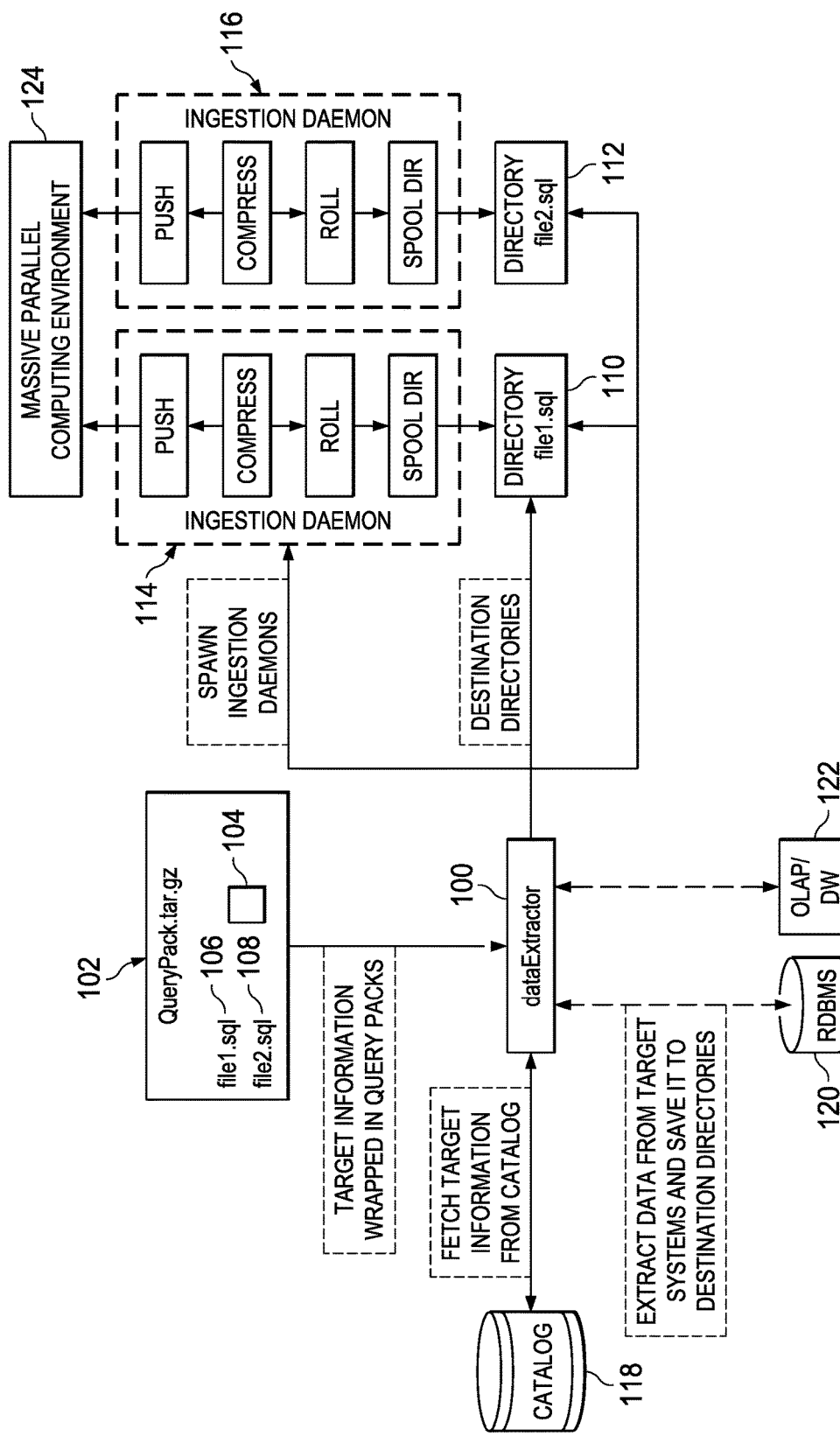
FIG. 1 is a block diagram of a data extractor architecture in accordance with an illustrative embodiment.

The illustrative embodiments recognize and take into account that some big data environments are so large and so diverse in terms of the number of databases to be queried, that even many computers operating in parallel, such as in a HADOOP® cluster, can have difficulty extracting desired data and/or extracting data in a timely fashion. For example, a use case was tested for the illustrative embodiments. In this use case a query was made to extract desired data from 86,000 relational databases containing billions of records, where not all relational databases were compatible with each other, and also including thousands of target schema containing additional desired information. Traditional techniques for data extraction, such as those described below, either failed to retrieve the desired data upon a search query, or failed to retrieve the desired data within a desirable amount of time, even using massively parallel computing, such as a HADOOP® cluster. Thus, the illustrative embodiments solve a computer-centric problem of extracting desired data in a big data environment. The illustrative embodiments also solve a computer-centric problem of extracting the desired data more quickly than existing data extraction tools.

Prior art tools for extracting information from a big data environment include FLUME® and SQOOP®, but offered by the APACHE SOFTWARE FOUNDATION®. This software takes structured data files and loads them into a cluster of computers for parallel processing. However, this software opens up the file and processes the relational databases on a row-by-row basis, which takes an unreasonable amount of time when processing billions of records. SQOOP® physically connects to relational databases and can move parts or queries into clusters of computers for parallel processing. However, SQOOP requires running setup calls in a session before data extraction from the databases, and pre-processing calls are not supported. Also, without a manual framework neither software tool supports parallelism with the amount of databases for very large sets of databases, such as those in the use case of interest.

Those of skill in the art would recognize that traditional Internet search engines could not be used for searching relational databases and schema, as in the above use case. For example, Internet search engines such as GOOGLE® or BING® are designed to search HTML web pages, plain text, or images, not the records of relational databases or the specialized data structures of various schema used to store data. Internet search engines cannot be used to search relational databases and schema in a big data environment. Those of skill in the art recognize that more specialized search tools are needed for such data extraction.

The illustrative embodiments also recognize and take into account that only using a massively parallel computing environment, such as a HADOOP® cluster is inadequate to the data extraction task contemplated. A HADOOP® cluster relies on dividing blocks of data among a large number of slave computers operating in parallel and coordinated by one or more master computers. However, the blocks of data must still be made available to the HADOOP® cluster, so the cluster may not be able to provide the desired query results. Even if capable, searching every database row by row may be undesirably time consuming even for a HADOOP® cluster.

Thus, the illustrative embodiments recognize and take into account that a data extractor for extracting possible data of interest from the big data environment is desirable. The data extractor can initially parse the relational databases and schema as being targets for search, and then concatenate these files without opening them. The HADOOP® cluster can then operate on these concatenated files in a much more efficient manner.

However, the illustrative embodiments recognize and take into account that retrieving targeted data from a large number of databases to inject into big data servers such as a HADOOP® cluster, has several challenges. One such challenge is the efficiency in workload management of a large number of queries against a large number of relational databases and schema. A second such challenge is efficiency in injecting a large number of query results into big data server cluster, such as a HADOOP® cluster.

The illustrative embodiments solve these challenges. The illustrative embodiments provide for a parallel data extraction tool which can run large amounts of queries across large amounts of databases in a predictable and repeatable fashion. This tool may be referred-to as "DXR" (data extractor). DXR writes file contents extracted from a large number of relational databases and schema in a big data environment into files of a local file system. DXR has the option to concatenate these files and write them into a massively parallel computing environment, such as a HADOOP® cluster. The massively parallel computing environment can then process these files to extract the specific information that relates to the query at issue.

Attention is now returned to the use case described above. DXR was created to fulfill a need to execute a potential workload of thousands of queries across tens of thousands of databases and schema containing billions of records for the purpose of loading the result sets into a Hadoop® cluster.

Both Apache SQOOP® and FLUME® were analyzed as potential data extraction and ingestion tools for this use case. Both had shortcomings which prevented their use. In addition to taking a very large amount of time to setup thousands of SQOOP® jobs, at the time of this experiment SQOOP® did not support session setup calls prior to running queries in databases. The queries being used also access views and other data side business logic which prevented taking advantage of multithreaded extraction optimizations and object level extraction features in SQOOP®.

An implementation of FLUME® was also considered for handling the ingestion portion of data transfer. Reliable file channel based FLUME® agents were designed with sink groups along with load balancing capabilities. However, these FLUME® agents quickly saturated the local disk due to the inherent nature of how FLUME® processes data on a record-by-record basis. With the amount of data and the rate at which the data was generated, FLUME® was simply too slow for this use case.

Attention is now turned to the architecture of the data extractor of the illustrative embodiments. DXR may be written in PYTHON® and may utilize abstract classes to allow extensibility for other databases, data manipulation and securing techniques, and ingestion into other filesystems. DXR uses the concept of "targets" to delineate between different data sources which are being targeted for data extraction. This generic term was chosen because a relational database is not always the target for data extraction. In some cases, only a specific schema is targeted. DXR may utilizes several main components, as shown in FIG. 1 below, to achieve the desired outcome.

The data extractor of the illustrative embodiments uses a specialized catalog, which may be termed a DXR catalog. The DXR catalog is a schema which lives in a relational database management system and stores all the required connection information for the targets. The DXR catalog also stores logging information in the schema, which allows simple queries to be written for monitoring and job verification purposes.

The data extractor of the illustrative embodiments also uses a query pack. A query pack may be a tarball containing one configuration file and one or more files containing queries to execute on each target. A tarball is a computer file format that can combine multiple files into a single file. The configuration file also contains a section for each file in the query pack so each query can have customized configurations as desired.

The data extractor of the illustrative embodiments also uses a target query. The target query is a file provided by the user which will be run against the DXR catalog to get all the relevant fields and filter for the specific targets from which the user would like to extract data.

The data extractor of the illustrative embodiments also uses a DXR configuration file. This file contains configurations used for a single run of the DXR. The DXR configuration file includes items such as pool size and DXR catalog connection information.

The data extractor of the illustrative embodiments also uses a worker pool. The worker pool includes of a number of processes specified for a specific run. See FIG. 2 for an example of a worker pool. These processes will service the query execution and will only be idle when there isn't enough work for all processes to be busy.

The data extractor of the illustrative embodiments also uses a set of ingestion daemons. A "daemon", in multitasking computing, is a computer program that runs as a background process, rather than being under the direct control of an interactive user. In the illustrative embodiments, the ingestion daemons may be HADOOP® Distributed File System (HDFS) ingestion daemons. If a user chooses HDFS ingestion, one HDFS daemon will be started for every query file in the query pack. The ingestion daemons will each monitor the local output file system for files and concatenate the files until the local file breaches the roll size in bytes specified in the DXR configuration file. If a roll size is not specified, the roll may default to 209,715,200 bytes, but this default number may be pre-selected to be a different value as desired. Whichever specific daemon process is used, this process does not open the files. This process might only support gzip or plain text files. Because the files are not opened, the resulting extracted files can be larger than the specified roll size, but never smaller.

Thus, the main components of the DXR of the illustrative embodiments are to drive execution of queries, manage workload, and manage metadata storage. The DXR of the illustrative embodiments can put together a package of queries, pass parameters as to where a package is, specify which databases are to be run, and where output goes.

The DXR of the illustrative embodiments may start up a parallel framework to which all work is submitted, and that work is the driver that runs the individual query. The DXR of the illustrative embodiments also may start an additional component if the user wants the data to be directed into a massively parallel computing cluster. In this case, the DXR of the illustrative embodiments may take extracted data into a data staging area, and then combine that data for a parallel computing framework and then instruct the framework to execute.

The DXR of the illustrative embodiments may be provided with additional functionality. For example, the DXR of the illustrative embodiments may be configured to allow a user to determine if some of the data is to be obscured. The DXR of the illustrative embodiments can then move that data to a location that can be secured. Thus, the DXR of the illustrative embodiments may be independent of any massively parallel computing environment, and can be a standalone product that might also be configured to interact with another product such as HADOOP®.

The DXR of the illustrative embodiments improve query management efficiency by establishing a worker pool to accept as many queries as users are submitting. In addition, queries may be bundled. Bundles of queries may utilize a configuration file to provide additional instructions on how the queries should be run.

In improving query results and injection efficiency, file names may be utilized to direct query results to be sent to specific folders, to be subsequently concatenated when certain conditions are met. Upon concatenation, larger files, rather than individual query result records, may be injected into big data server, such as but not limited to a HADOOP® cluster.

FIG. 1 is a block diagram of a data extractor architecture in accordance with an illustrative embodiment. Data extractor 100 may be the data extractor or DXR described above.

In an illustrative embodiment, data extractor 100 wraps target information in one or more query packs, such as query pack 102. The query pack includes a configuration file, such as configuration file 104, and one or more configuration files, such as file 1 106 and file 2 108. Configuration file 104 may specify destination directories into which extracted data will be placed, such as directory 110 and directory 112.

Data extractor 100 may spawn ingestion daemons for processing the query files in query pack 102. Thus, for example, ingestion daemon 114 and ingestion daemon 116 may operate in parallel to process individual query files to extract desired data. The relational databases and schema which contain the desired data are called targets. Data extractor 100 fetches target information from catalog 118.

Data extractor then uses the information from the catalog to extract data from target systems, such as relational databases, RDBMS 120, and schema, OLAP/DW 122. The extracted data may be processed by the ingestion daemons such that unopened files are concatenated and stored in rolls. These rolls, unopened files, or concatenated data are then processed in massive parallel computing environment 124. Massive parallel computing environment 124 may be a HADOOP® cluster, but also may be other kinds of parallel computing environments, or possibly may be one or more so-called super computers. Massive parallel computing environment 124 then processes the concatenated files to retrieve the information desired by the user as specified in the query files in query pack 102. The result is an output with the desired retrieved information.

Figure 2:
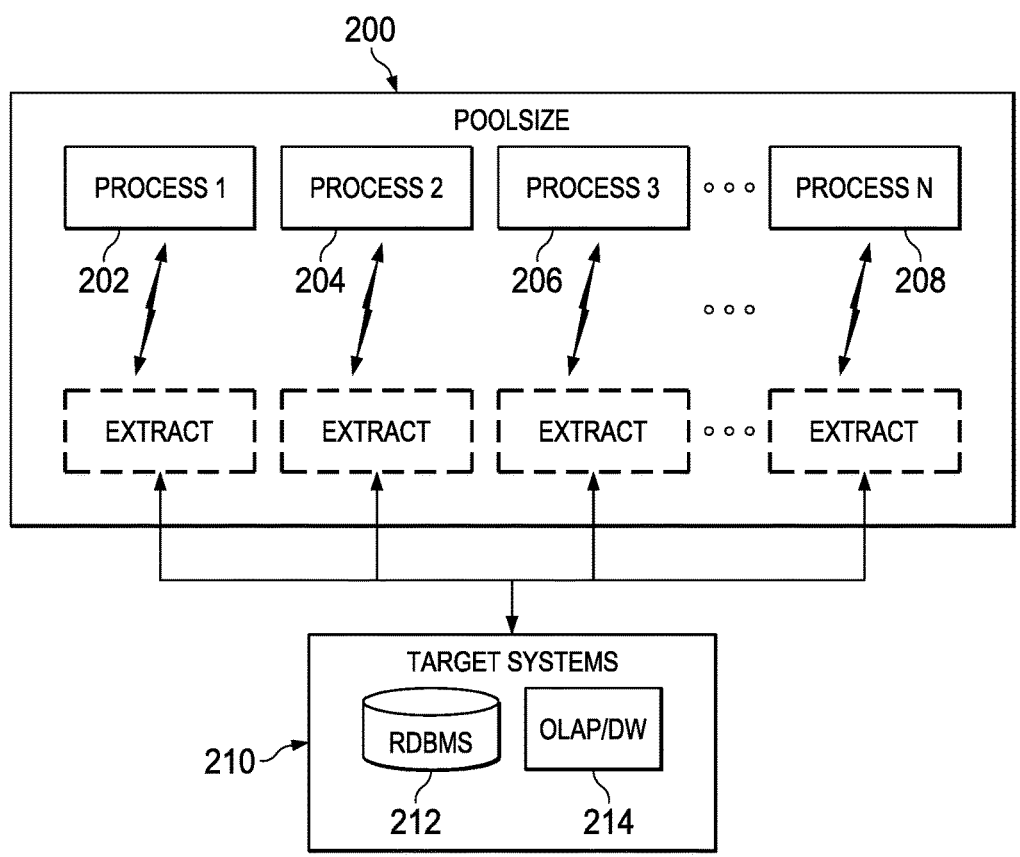
FIG. 2 is a block diagram of operation of a worker pool in accordance with an illustrative embodiment.

FIG. 2 is a block diagram of operation of a worker pool in accordance with an illustrative embodiment. Worker pool 200 may be a plurality of ingestion daemons operating on individual query files from a query pack, such as ingestion daemon 114, ingestion daemon 116, query pack 102, configuration file 104, and file 1 106 in FIG. 1. Worker pool 200 may have a pool size defined by the number of processes or ingestion daemons operating in parallel, which in FIG. 2 is "N" processes or "N" ingestion daemons.

Thus, each process in FIG. 2, including process 1 202, process 2 204, process 3 206, and process "N" 208 may be an ingestion daemon as described with respect to FIG. 1. Each process extracts data from target systems 210, which may be relational databases, RDBMS 212, and schema, OLAP/DW 214. Relational databases, RDBMS 212 may be relational databases 120 of FIG. 1 and schema, OLAP/DW 214 may be schema, OLAP/DW 122 of FIG. 1. Typically, one process acts on one target. However, in some cases one process may act on multiple targets.

Figure 3:
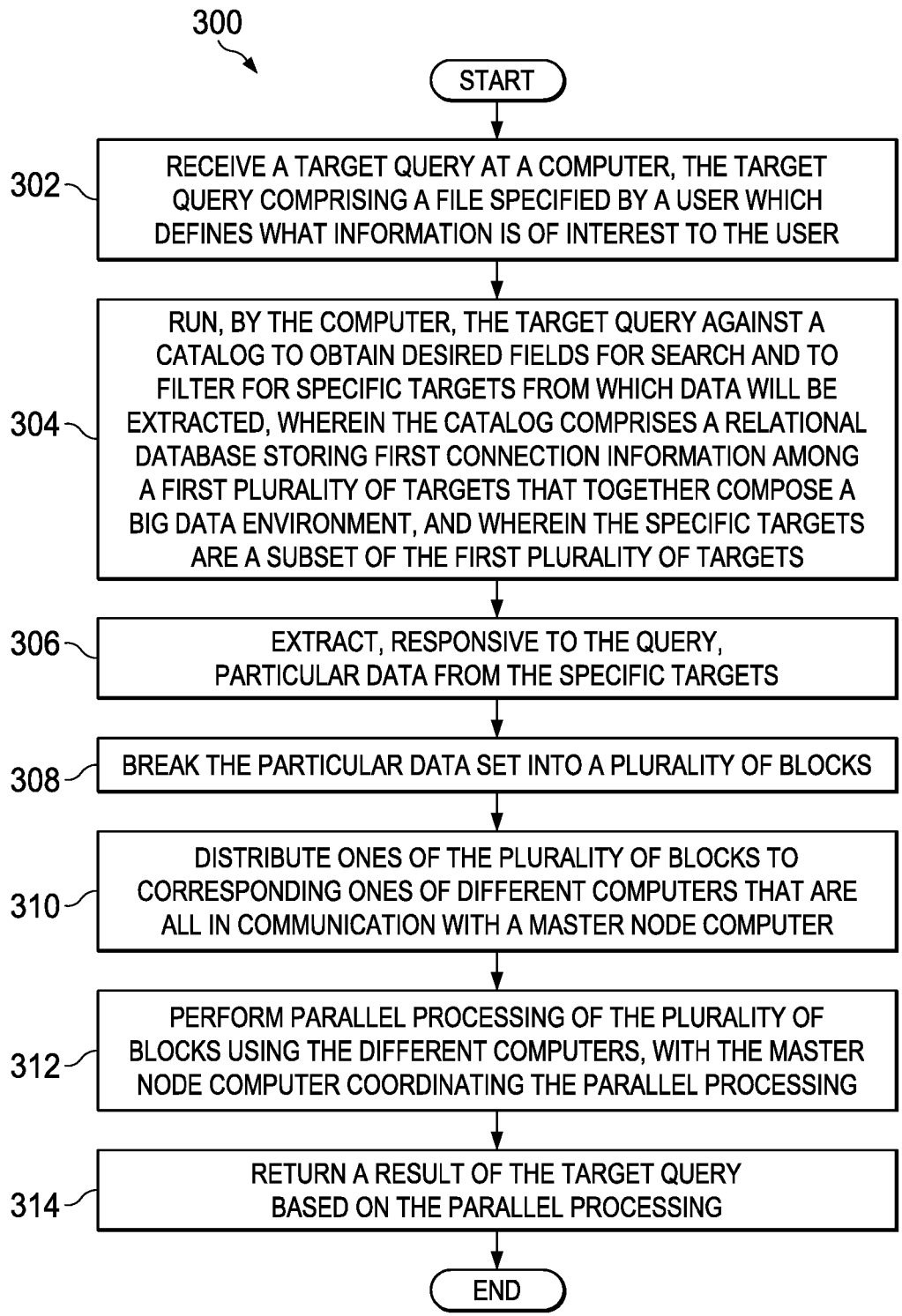
FIG. 3 is a flowchart of a computer-implemented method for extracting information in a big data environment.

FIG. 3 is a flowchart of a computer-implemented method for extracting information in a big data environment. Method 300 is a specific example of a process of extracting information using a data extractor or DXR, as described above, including for FIG. 1 and FIG. 2. Method 300 may be implemented using one or more computers. Method 300 cannot be performed by a human because method 300 is performed in a big data environment in which it is impossible for a human to sort through the information.

Method 300 includes receiving a target query at a computer, the target query comprising a file specified by a user which defines what information is of interest to the user (operation 302). Method 300 also includes running, by the computer, the target query against a catalog to obtain desired fields for search and to filter for specific targets from which data will be extracted, wherein the catalog comprises a relational database storing first connection information among a first plurality of targets that together compose a big data environment, and wherein the specific targets are a subset of the first plurality of targets (operation 304).

Method 300 also includes extracting, responsive to the query, particular data from the specific targets (operation 306). Extracting may include defining a query pack comprising a configuration file and one or more files containing queries to execute on each target in the specific targets, wherein the configuration file contains a section for each of the one or more files to customize configurations for each of the one or more files, and wherein the configuration file also comprises particular connection information defining relationships among the specific targets, the particular connection information being part of the first connection information. Extracting also may include executing one ingestion daemon for every file of the one or more files in the query pack, wherein each ingestion daemon monitors a local output file system for output files and concatenates the output files, and wherein each ingestion daemon avoids opening the output files. Executing results in a particular data set.

Method 300 also includes breaking the particular data set into a plurality of blocks (operation 308). Method 300 also includes distributing ones of the plurality of blocks to corresponding ones of different computers that are all in communication with a master node computer (operation 310).

Method 300 also includes performing parallel processing of the plurality of blocks using the different computers, with the master node computer coordinating the parallel processing (operation 312). Method 300 also includes returning a result of the target query based on the parallel processing (operation 314). In one illustrative embodiment, the method may terminate thereafter.

Method 300 may be varied. For example, in one illustrative embodiment each ingestion daemon is processed by a corresponding worker process in a worker pool. The worker pool includes a plurality of processes specified by the query pack.

In another illustrative embodiment, each ingestion daemon ceases monitoring and concatenating when a local file breaches a roll size in bytes specified in the configuration file. In yet another illustrative embodiment, a new local file is started after the local file breaches the roll size.

In still another illustrative embodiment, the specific targets comprise at least some different target types that are incompatible with each other. In a related illustrative embodiment, the specific targets comprise a mix of a plurality of relational databases and a plurality of schemas. In still another illustrative embodiment, the catalog comprises a schema in a relational database. In this case, the method further includes storing logging information in the schema.

Other variations are possible. Therefore, the illustrative embodiments are not necessarily limited to these examples.

Figure 4:
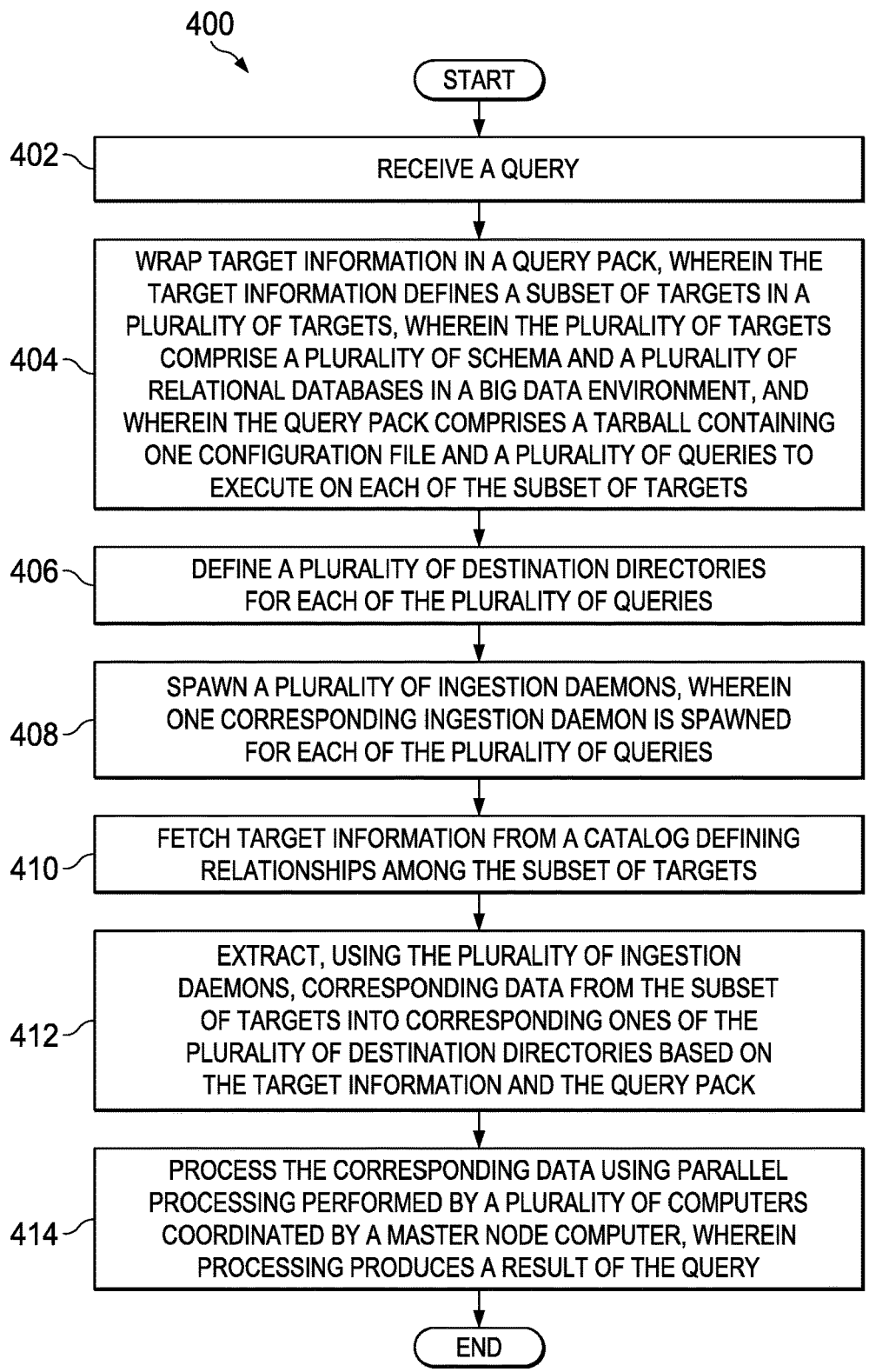
FIG. 4 is a flowchart of another computer-implemented method for extracting information in a big data environment.

FIG. 4 is a flowchart of another computer-implemented method for extracting information in a big data environment. Method 400 is a specific example of a process of extracting information using a data extractor or DXR, as described above, including for FIG. 1 and FIG. 2. Method 400 may be a variation of method 300 of FIG. 3. Method 400 may be implemented using one or more computers. Method 400 cannot be performed by a human because method 400 is performed in a big data environment in which it is impossible for a human to sort through the information.

Method 400 may include receiving a query (operation 402). Method 400 may also include based on the query, wrapping target information in a query pack, wherein the target information defines a subset of targets in a plurality of targets, wherein the plurality of targets comprise a plurality of schema and a plurality of relational databases in a big data environment, and wherein the query pack comprises a tarball containing one configuration file and a plurality of queries to execute on each of the subset of targets (operation 404).

Method 400 may also include defining a plurality of destination directories for each of the plurality of queries (operation 406). Method 400 may also include spawning a plurality of ingestion daemons, wherein one corresponding ingestion daemon is spawned for each of the plurality of queries (operation 408).

Method 400 may also include fetching target information from a catalog defining relationships among the subset of targets (operation 410). Method 400 may also include extracting, using the plurality of ingestion daemons, corresponding data from the subset of targets into corresponding ones of the plurality of destination directories based on the target information and the query pack (operation 412).

Method 400 may also include processing the corresponding data using parallel processing performed by a plurality of computers coordinated by a master node computer, wherein processing produces a result of the query (operation 414). In an illustrative embodiment, the method may terminate thereafter.

Method 400 may be varied. For example, in an illustrative embodiment, the plurality of ingestion daemons is executed by a worker pool comprising a plurality of processes specified by the query pack. In another variation, the configuration file contains configurations required for execution of the query pack.

In still another variation, the configuration file further specifies a maximum size for files generated by the plurality of ingestion daemons. In yet another variation, the configuration file further specifies catalog connection information to be obtained from the catalog.

In another variation, the plurality of ingestion daemons also monitor local output file sizes and concatenates local output files until a roll size is reached for a given concatenated file. In yet another variation, the plurality of ingestion daemons avoids opening any files.

Other variations are possible. Therefore, the illustrative embodiments are not necessarily limited to these examples.

Figure 5:
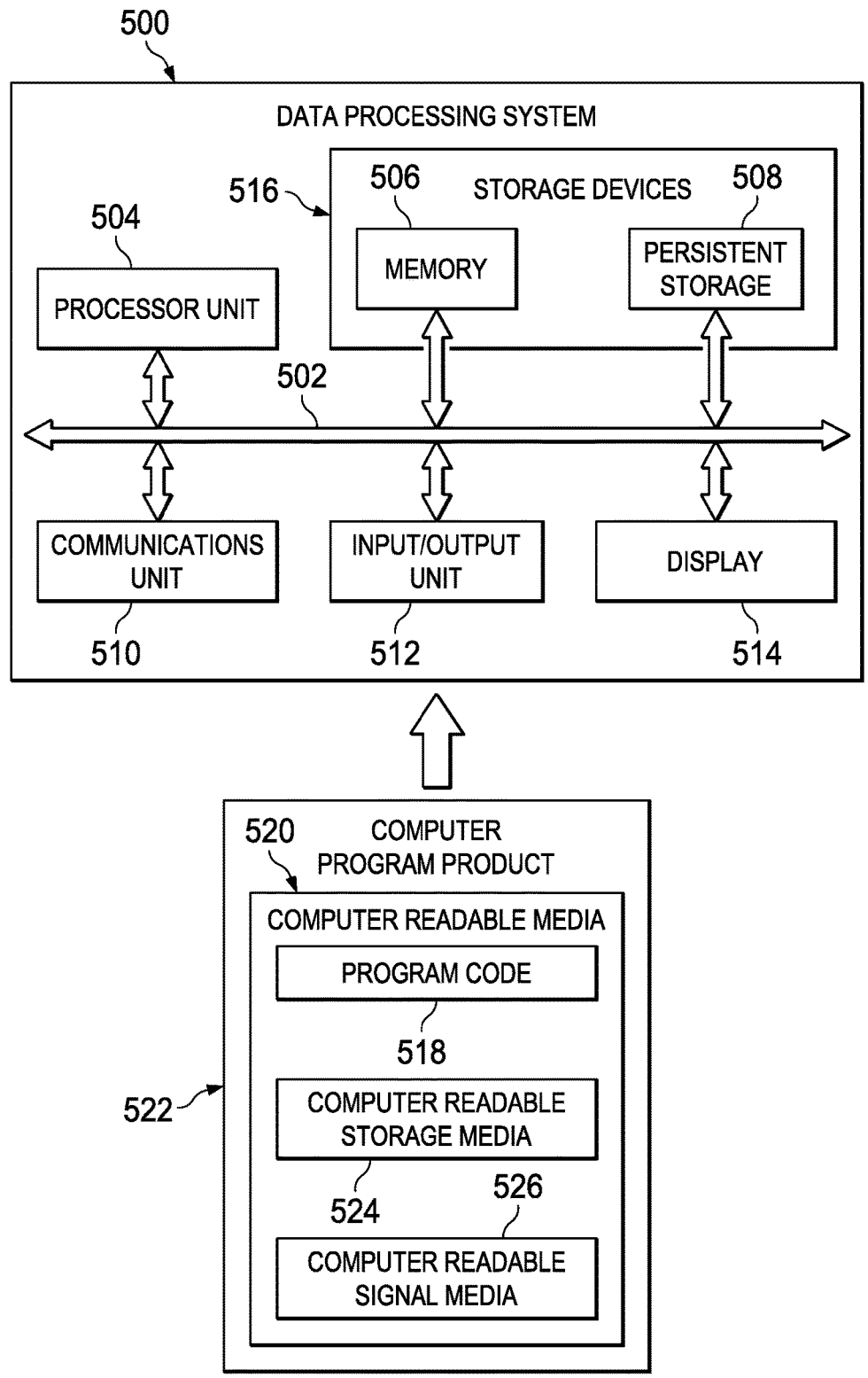
FIG. 5 is a block diagram of a data processing system in accordance with an illustrative embodiment.

FIG. 5 is a block diagram of a data processing system depicted in accordance with an illustrative embodiment. Data processing system 500 is an example of a computer as described with respect to FIG. 1 through FIG. 4.

In this illustrative example, data processing system 500 includes communications framework 502, which provides communications between processor unit 504, memory 506, persistent storage 508, communications unit 510, input/output unit 512, and display 514. In this example, communications framework 502 may take the form of a bus system.

Processor unit 504 serves to execute instructions for software that may be loaded into memory 506. Processor unit 504 may be a number of processors, a multi-processor core, or some other type of processor, depending on the particular implementation.

Memory 506 and persistent storage 508 are examples of storage devices 516. A storage device is any piece of hardware that is capable of storing information, such as, for example, without limitation, at least one of data, program code in functional form, or other suitable information either on a temporary basis, a permanent basis, or both on a temporary basis and a permanent basis. The program code may be the software on massive parallel computing environment 124 of FIG. 1. Storage devices 516 may also be referred to as computer-readable storage devices in these illustrative examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these illustrative examples, provides for communications with other data processing systems or devices. In these illustrative examples, communications unit 510 is a network interface card.

Input/output unit 512 allows for input and output of data with other devices that may be connected to data processing system 500. For example, input/output unit 512 may provide a connection for user input through at least of a keyboard, a mouse, or some other suitable input device. Further, input/output unit 512 may send output to a printer. Display 514 provides a mechanism to display information to a user.

Instructions for at least one of the operating system, applications, or programs may be located in storage devices 516, which are in communication with processor unit 504 through communications framework 502. The processes of the different embodiments may be performed by processor unit 504 using computer-implemented instructions, which may be located in a memory, such as memory 506.

These instructions are referred to as program code, computer-usable program code, or computer-readable program code that may be read and executed by a processor in processor unit 504. The program code in the different embodiments may be embodied on different physical or computer-readable storage media, such as memory 506 or persistent storage 508.

Program code 518 is located in a functional form on computer-readable media 520 that is selectively removable and may be loaded onto or transferred to data processing system 500 for execution by processor unit 504. Program code 518 and computer-readable media 520 form computer program product 522 in these illustrative examples. In one example, computer-readable media 520 may be computer-readable storage media 524 or computer-readable signal media 526.

In these illustrative examples, computer-readable storage media 524 is a physical or tangible storage device used to store program code 518 rather than a medium that propagates or transmits program code 518.

Alternatively, program code 518 may be transferred to data processing system 500 using computer-readable signal media 526. Computer-readable signal media 526 may be, for example, a propagated data signal containing program code 518. For example, computer-readable signal media 526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 500 are not meant to provide architectural limitations to the manner in which different embodiments may be implemented. The different illustrative embodiments may be implemented in a data processing system including components, in addition to or in place of those illustrated for data processing system 500. Other components shown in FIG. 5 can be varied from the illustrative examples shown. The different embodiments may be implemented using any hardware device or system capable of running program code 518.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Many modifications and variations will be apparent to those of ordinary skill in the art. Further, different illustrative embodiments may provide different features, as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

As used herein, the term "server computer" is any computer which operates in the role of a server, whether or not the computer is configured specifically to operate as a "server." As used herein, the term "client computer" is any computer which operates in the roll of a client, whether or not the computer is configured specifically to operate as a "client" or a "workstation."

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method comprising:
receiving a target query at a computer, the target query comprising a file specified by a user which defines what information is of interest to the user;
running, by the computer, the target query against a catalog to obtain desired fields for search and to filter for specific targets from which data will be extracted, wherein the catalog comprises a relational database storing first connection information among a first plurality of targets that together compose a big data environment, and wherein the specific targets are a subset of the first plurality of targets;
extracting, responsive to the target query, particular data from the specific targets, wherein extracting comprises:
defining a query pack comprising a configuration file and one or more files containing queries to execute on each target in the specific targets, wherein the configuration file contains a section for each of the one or more files to customize configurations for each of the one or more files, and wherein the configuration file also comprises particular connection information defining relationships among the specific targets, the particular connection information being part of the first connection information; and
executing one ingestion daemon for every file of the one or more files in the query pack, wherein each ingestion daemon monitors a local output file system for output files and concatenates the output files, and wherein each ingestion daemon avoids opening the output files, and wherein executing results in a particular data set;
breaking the particular data set into a plurality of blocks;
distributing ones of the plurality of blocks to corresponding ones of different computers that are all in communication with a master node computer;
performing parallel processing of the plurality of blocks using the different computers, with the master node computer coordinating the parallel processing; and
returning a result of the target query based on the parallel processing.

2. The computer-implemented method of claim 1, wherein each ingestion daemon is processed by a corresponding worker process in a worker pool, the worker pool comprising a plurality of processes specified by the query pack.

3. The computer-implemented method of claim 1, wherein each ingestion daemon ceases monitoring and concatenating when a local file breaches a roll size in bytes specified in the configuration file.

4. The computer-implemented method of claim 3, wherein a new local file is started after the local file breaches the roll size.

5. The computer-implemented method of claim 1, wherein the specific targets comprise at least some different target types that are incompatible with each other.

6. The computer-implemented method of claim 5, wherein the specific targets comprise a mix of a plurality of relational databases and a plurality of schemas.

7. The computer-implemented method of claim 1, wherein the catalog comprises a schema in a relational database, and wherein the method further comprises:
storing logging information in the schema.

8. A computer-implemented method comprising:
receiving a query;
based on the query, wrapping target information in a query pack, wherein the target information defines a subset of targets in a plurality of targets, wherein the plurality of targets comprise a plurality of schema and a plurality of relational databases in a big data environment, and wherein the query pack comprises a tarball containing one configuration file and a plurality of queries to execute on each of the subset of targets;
defining a plurality of destination directories for each of the plurality of queries;
spawning a plurality of ingestion daemons, wherein one corresponding ingestion daemon is spawned for each of the plurality of queries;
fetching target information from a catalog defining relationships among the subset of targets;
extracting, using the plurality of ingestion daemons, corresponding data from the subset of targets into corresponding ones of the plurality of destination directories based on the target information and the query pack; and
processing the corresponding data using parallel processing performed by a plurality of computers coordinated by a master node computer, wherein processing produces a result of the query.

9. The computer-implemented method of claim 8, wherein the plurality of ingestion daemons are executed by a worker pool comprising a plurality of processes specified by the query pack.

10. The computer-implemented method of claim 8, wherein the configuration file contains configurations required for execution of the query pack.

11. The computer-implemented method of claim 10, wherein the configuration file further specifies a maximum size for files generated by the plurality of ingestion daemons.

12. The computer-implemented method of claim 11, wherein the configuration file further specifies catalog connection information to be obtained from the catalog.

13. The computer-implemented method of claim 8, wherein the plurality of ingestion daemons also monitor local output file sizes and concatenates local output files until a roll size is reached for a given concatenated file.

14. The computer-implemented method of claim 13, wherein the plurality of ingestion daemons avoid opening any files.

15. A non-transitory computer-recordable storage medium storing program code which, when executed by a processor, performs a computer-implemented method, the program code comprising:
program code for receiving a query;
program code for, based on the query, wrapping target information in a query pack, wherein the target information defines a subset of targets in a plurality of targets, wherein the plurality of targets comprise a plurality of schema and a plurality of relational databases in a big data environment, and wherein the query pack comprises a tarball containing one configuration file and a plurality of queries to execute on each of the subset of targets;

program code for defining a plurality of destination directories for each of the plurality of queries;

program code for spawning a plurality of ingestion daemons, wherein one corresponding ingestion daemon is spawned for each of the plurality of queries;

program code for fetching target information from a catalog defining relationships among the subset of targets;

program code for extracting, using the plurality of ingestion daemons, corresponding data from the subset of targets into corresponding ones of the plurality of destination directories based on the target information and the query pack; and program code for processing the corresponding data using parallel processing performed by a plurality of computers coordinated by a master node computer, wherein processing produces a result of the query.

16. The non-transitory computer-recordable storage medium of claim 15, wherein the program code further includes program code for the plurality of ingestion daemons to be executed by a worker pool comprising a plurality of processes specified by the query pack.

17. The non-transitory computer-recordable storage medium of claim 15, wherein the configuration file contains configurations required for execution of the query pack.

18. The non-transitory computer-recordable storage medium of claim 17, wherein the configuration file further specifies a maximum size for files generated by the plurality of ingestion daemons.

19. The non-transitory computer-recordable storage medium of claim 17, wherein the configuration file further specifies catalog connection information to be obtained from the catalog.

20. The non-transitory computer-recordable storage medium of claim 15, wherein the program code further includes program code for the plurality of ingestion daemons to also monitor local output file sizes and to concatenate local output files until a roll size is reached for a given concatenated file, and wherein program further prevents the plurality of ingestion daemons from opening any files.

* * * * *